May 1, 1934. N. B. JANSSEN 1,956,798
TORSIONAL SHOCK ABSORBER
Filed Jan. 3, 1933
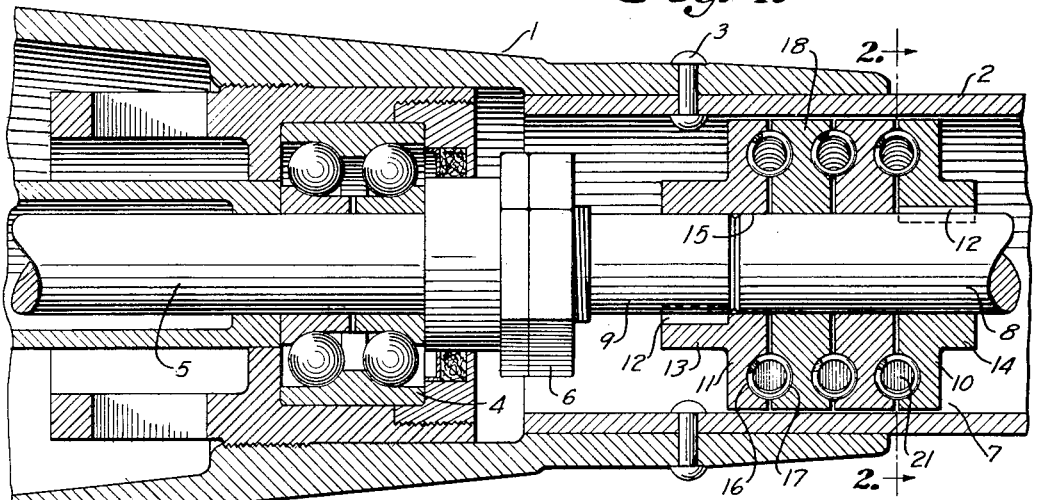
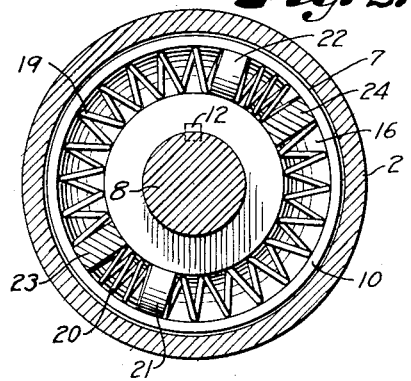
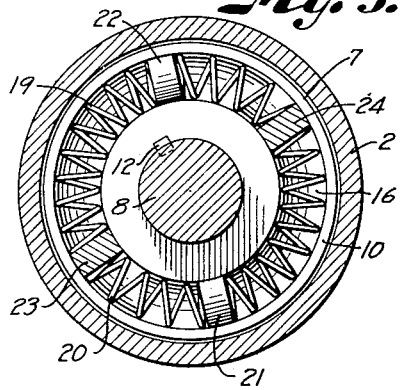
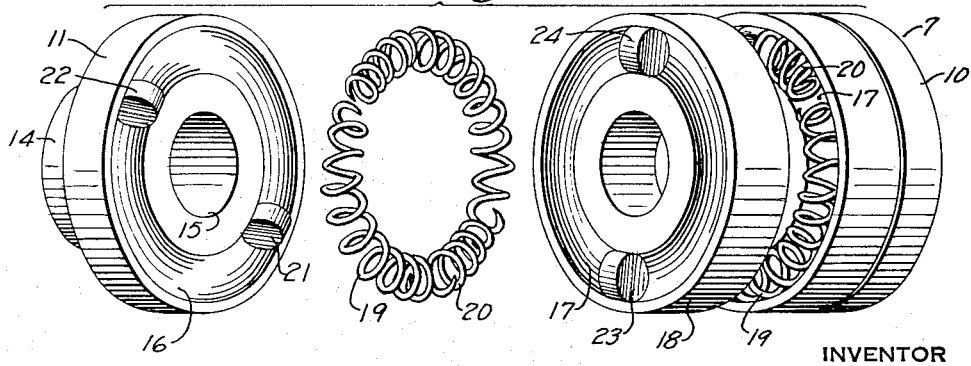
INVENTOR
Niels B. Janssen.
BY
ATTORNEY Patented May 1, 1934

1,956,798

UNITED STATES PATENT OFFICE 1,956,798

TORSIONAL SHOCK ABSORBER

Niels B. Janssen, Kansas City, Mo.

Application January 3, 1933, Serial No. 649,818

6 Claims. (Cl. 64—96)

My invention relates to shock absorbers and more particularly to a device of that character for automatically cushioning torsional shocks or sudden torque stresses imparted by a driving to a driven shaft member regardless of variation in load conditions and without loss of energy, the present invention being especially adapted for use in the drive or propeller shaft of a motor driven vehicle to convey power from the motor in smooth flow to the drive wheels.

Shock absorbers have heretofore been devised for a similar purpose but those of which I am aware have been so constructed as to limit the rotative movement of one shaft member to only a partial turn independently of a cooperating shaft member, thereby restricting the cushioning capacity of the devices.

Since the torsional shocks delivered to the propeller shaft of an automotive vehicle vary from the individual power impulses of the motor unit to the relatively severe torque strains caused, for example, by improper application of the motor power to the drive wheels through the medium of the clutch, a wider range of cushioning capacity is required than can be obtained with devices providing for only a partial rotation of the driving member in cushioned relation to the driven member.

It is, therefore, the principal object of my invention to provide a shock absorber whereby the driving and driven members are connected in cushioned relation in a manner to permit variable differential rotation of the driving member relatively to the driven member and which may vary more than one complete rotation of the driving member.

A further object of my invention is to provide a shock absorber having cushioning capacities graduated to the range of shocks to which a driven shaft is subjected.

Another object of the invention is to provide a cushioning device of simple construction having interchangeable parts so that the shock absorbing capacity of the device can be readily varied to meet the existing requirements.

In accomplishing these and other objects of my invention I have provided improved details of structure, the preferred form of which is illustrated in the accompanying drawing, wherein:

Fig. 1 is a longitudinal central section of a differential housing portion journaling a driven shaft member operatively connected to a drive shaft by a torsional shock absorber constructed in accordance with my invention.

Fig. 2 is a cross section of the shock absorber on the line 2—2, Fig. 1, illustrating the action of the absorber springs in cushioning a reverse drive of the driven member.

Fig. 3 is a similar view showing the position of the springs when the driven member is turned in a forward direction.

Fig. 4 is a perspective view of the shock absorber in partly disassembled relation.

Referring more in detail to the drawing:

1 designates the forward portion of a differential housing joined to the rear end of a torque tube 2 by rivets 3 and supporting a bearing 4 journaling the usual propeller or drive shaft 5, held in longitudinally adjusted position by nuts 6 threaded on the shaft and engaging the bearing. The rear end of the shaft carries the usual pinion gear meshing with differential ring gear to transmit power to the drive wheels while the forward end of the shaft is commonly connected to the power unit by means of a conventional clutch, transmission and universal joint, these parts and their relation being well known, and, therefore, not shown in the present application.

In order to balance the power impulses of the motor unit and transmit a smooth flow of power to the drive wheels, and to absorb violent torque shocks imparted from the motor to the drive wheels or vice versa by improper manipulation of the clutch I have provided a shock absorber unit generally designated 7.

The shock absorber is preferably located in the torque tube adjacent its rear end but may obviously be installed at any suitable point between the power unit and drive wheels where it is possible to sever the drive or propeller shaft and thus produce aligned driving and driven shaft members or sections 8 and 9 respectively.

The absorber unit includes anchor members or collars 10 and 11 respectively, secured in facing relation by keys 12 or the like to the shaft sections 8 and 9, the collar 11 preferably having a concentric flange 13 of greater length than a similar flange 14 of the collar 10 to provide sufficient anchorage for the section 9 and leave a socket 15 to rotatably receive and serve as a bearing for the adjacent end of the section 8.

Each anchor member is preferably provided on its inner face with an annular groove 16 substantially semi-circular in cross section to cooperate with a similar groove 17 in a floating disk or member 18 for seating cushioning springs or equivalent resilient members 19 and 20.

For illustrative purposes I have shown only two of the floating members or collars interposed between the keyed collars, however, this number may be varied as required since the floating collars are provided with the annular grooves 17 in their opposite faces and are, therefore, interchangeable.

Laterally directed stop heads 21 and 22 are preferably fixed at diametrically opposite points in the grooves of the anchor members and have portions adapted to seat in the complementary or mating grooves of the floating collars for arcuate travel therein, while like stop heads 23 and 24 in the grooves of the latter collars project into the grooves of the anchor members to confine the springs in separated relation in the grooves with the spring ends bearing against the stop heads.

As clearly shown in Figs. 2 and 3, I prefer to use a pair of long springs 19 and a pair of relatively short springs 20 in each groove of circular cross section formed by a pair of abutting collars, the long springs serving to cushion the shocks imparted to the driven shaft section incidental to forward rotation of the driving section, and the shorter springs absorbing the torsional shocks conferred on the driven shaft when moved in a reverse direction.

Assuming a vehicle to be provided with a shock absorbing unit as described, the operation of the unit when driving the vehicle in forward direction would be as follows:

Torsional shocks transmitted to the driving section 8 are progressively cushioned by the longer springs 19 until the anchor member 11 is caused to turn and rotate the driven section 9. Should the speed of the vehicle be proportionately greater than that of the motor as when traveling down a steep grade, the section 9 becomes the driving member and the section 8 the driven member, the shocks being cushioned by the springs as before. When driving the vehicle in reverse the shorter springs will act, in the manner described above, to absorb the torsional shocks.

It may be found desirable to employ springs of graduated tension so that the power impulses of the motor are partly absorbed by weaker springs and the more violent torque stresses cushioned by relatively strong springs, and that size and strength of the springs may be selective in accordance with the duty to be imposed on them.

Obviously the number of floating members may be increased indefinitely depending only upon the length of the shaft so that it is possible with my construction to obtain a number of rotations of the driving shaft section before the springs are compressed sufficiently to cause the driven section to begin to rotate.

With the use of the above described unit much wear and strain on the vehicle and its driving and driven parts and ordinary vibrations of the motor as well as those resulting from excessive loads imposed by sudden and unusual road conditions are eliminated and the comfort of the driver and passengers thus materially enhanced.

What I claim and desire to secure by Letters Patent is:

1. In combination with aligned driving and driven shaft sections, an anchor member fixed to each shaft section, a plurality of floating members interposed between the anchor members, resilient means having variable degrees of compressibility and interposed between said members for imparting progressive cushioning thrusts to the driven shaft section in response to rotation of the driven shaft section in one direction, and resilient means of variable degrees of compressibility and of different potentiality interposed between said members for imparting progressive cushioning thrusts to the driven shaft section in response to rotation of the driving shaft section in the other direction.

2. In combination with aligned driving and driven shaft sections, collars keyed to said sections having facing annular grooves, collars rotatably mounted on one of the shaft sections in abutting relation with each other and with the keyed collars and having registering annular grooves on their adjacent faces and annular grooves in their outer faces registering with the grooves in the keyed collars to form cylindrical annular chambers, stop heads fixed in each of the grooves of the respective collars projected into the groove of an adjacent collar and movable therein, and cushioning members seated in said chambers between the stop heads of relatively movable adjacent collars whereby cushioned thrust is imparted to the driven shaft section in response to rotation of the driving shaft section.

3. In combination with aligned driving and driven shaft sections, a collar fixed to one of the shaft sections having an annular groove in one of its side faces, a collar rotatable on said shaft section and operatively connected with the other shaft section and having an annular groove in one of its side faces mating with the groove in the first named collar, diametrically spaced stop heads fixed in the grooves of each of the respective collars each projected for arcuate travel in the mating groove of the other collar, and pairs of relatively long and short springs each seated in said mating grooves between the stop heads of respective collars, whereby rotation of the driving shaft section in each direction will effect cushioned thrust on the driven shaft in a corresponding direction through compression of one or the other of said springs.

4. In combination with aligned driving and driven shaft sections, collars keyed on the respective sections having facing annular grooves, a plurality of collars rotatably mounted on one of the shaft sections between the keyed collars and having annular grooves in their side faces each mating with the groove of an adjacent collar, diametrically spaced stop heads fixed in each of said grooves and projected for travel in the mating groove of an adjacent collar, and springs of different compressibility and cushioning capacity seated in each pair of mating grooves in abutment with opposite faces of the stop heads on the respective collars whereby shocks are taken up by said springs progressively proportional to the capacity of said springs.

5. In combination with aligned driving and driven shaft sections, collars keyed on the respective sections having facing annular grooves, a plurality of collars each rotatably mounted on one of the shaft sections having annular grooves in its side faces each mating with the groove of an adjacent collar, stop heads in said grooves each projected for travel in the mating groove of an adjacent collar, and pairs of long and short springs seated in each pair of mating grooves in abutment with opposite faces of the stop heads on the respective collars.

6. In combination with aligned driving and driven shaft sections, collars keyed to said sections having facing annular grooves, collars rotatably mounted on one of the shaft sections in abutting relation with each other and with the keyed collars and having registering annular grooves on their adjacent faces, and annular grooves in their outer faces registering with the grooves in the keyed collars to form cylindrical annular chambers, diametrically spaced stop heads fixed in each of said grooves and projected for travel in the mating grooves of the adjacent collar, and springs having different degrees of compressibility and cushioning capacity seated in each pair of mating grooves in abutment with opposite faces of the stop heads on the respective collars whereby shocks are taken up by said springs progressively to the proportion of the capacity of said springs.

NIELS B. JANSSEN.